United States Patent
Wagner et al.

(10) Patent No.: US 10,357,884 B2
(45) Date of Patent: *Jul. 23, 2019

(54) SYSTEMS AND METHODS FOR PROVIDING DYNAMIC VACUUM PRESSURE IN AN ARTICULATED ARM END EFFECTOR

(71) Applicant: Berkshire Grey, Inc., Lexington, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Somerville, MA (US); Daniel Smith, Pittsburgh, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,667

(22) Filed: Nov. 29, 2018

(65) Prior Publication Data

US 2019/0091879 A1    Mar. 28, 2019

Related U.S. Application Data

(62) Division of application No. 15/259,939, filed on Sep. 8, 2016.

(Continued)

(51) Int. Cl.
*B25J 15/06* (2006.01)
*B25J 9/16* (2006.01)
*B25J 13/08* (2006.01)

(52) U.S. Cl.
CPC ......... *B25J 15/0616* (2013.01); *B25J 9/1612* (2013.01); *B25J 13/085* (2013.01);
(Continued)

(58) Field of Classification Search
CPC ............... B25J 15/0616; B25J 15/0625; B25J 15/0658; B25J 15/0675; B25J 15/0683;
(Continued)

(56) References Cited

U.S. PATENT DOCUMENTS 2,853,333 A * 9/1958 Littell .................... B65G 47/91
294/189
3,005,652 A * 10/1961 Helm .................... B66C 1/0212
294/189

(Continued)

FOREIGN PATENT DOCUMENTS

DE    3810989 A1    8/1989
DE    10121344 A1   11/2002

(Continued)

OTHER PUBLICATIONS

Office Action issued by U.S. Patent & Trademark Office in related U.S. Appl. No. 16/047,713 dated Nov. 16, 2018.

(Continued)

*Primary Examiner* — Dean J Kramer
(74) *Attorney, Agent, or Firm* — Gesmer Updegrove LLP (57) ABSTRACT

A system is disclosed for providing dynamic vacuum control to an end effector of an articulated arm. The system includes a first vacuum source for providing a first vacuum pressure with a first maximum air flow rate, and a second vacuum source for providing a second vacuum pressure with a
(Continued)

second maximum air flow rate, wherein the second vacuum pressure is higher than the first vacuum pressure and wherein the second maximum air flow rate is greater than the first maximum air flow rate.

22 Claims, 11 Drawing Sheets

Related U.S. Application Data (60) Provisional application No. 62/215,489, filed on Sep. 8, 2015, provisional application No. 62/262,136, filed on Dec. 2, 2015.

(52) U.S. Cl.
CPC ....... *B25J 15/0625* (2013.01); *B25J 15/0658* (2013.01); *B25J 15/0675* (2013.01)

(58) Field of Classification Search
CPC .... B25J 15/0691; B25J 9/1612; B25J 13/085; B66C 1/0231; B66C 1/025; B66C 1/0287
See application file for complete search history.

(56) References Cited

U.S. PATENT DOCUMENTS

| | | | |
|---|---|---|---|
| 3,195,941 A * | 7/1965 | Morey | B66C 1/0212 294/189 |
| 3,959,864 A * | 6/1976 | Tell | F04F 5/22 29/888 |
| 4,389,064 A * | 6/1983 | Laverriere | B66C 1/025 209/905 |
| 4,412,775 A | 11/1983 | Molitor et al. | |
| 4,466,778 A * | 8/1984 | Volkmann | F04F 5/44 417/174 |
| 4,557,659 A * | 12/1985 | Scaglia | B65G 47/91 254/270 |
| 4,880,358 A * | 11/1989 | Lasto | F04F 5/22 417/174 |
| 4,960,364 A * | 10/1990 | Tell | F04F 5/22 417/151 |
| 5,024,575 A | 6/1991 | Anderson | |
| 5,683,227 A | 11/1997 | Nagai et al. | |
| 5,752,729 A * | 5/1998 | Crozier | B25B 11/007 294/188 |
| 5,865,487 A * | 2/1999 | Gore | B25J 15/06 294/2 |
| 6,015,175 A | 1/2000 | Raes et al. | |
| 6,244,640 B1 * | 6/2001 | Le Bricquer | B65G 47/91 294/185 |
| 6,397,876 B1 * | 6/2002 | Golden | F04F 5/52 137/14 |
| 6,817,639 B2 | 11/2004 | Schmalz et al. | |
| 7,140,389 B2 * | 11/2006 | Schnatterer | F04F 5/20 137/565.23 |
| 7,263,890 B2 * | 9/2007 | Takahashi | B25J 15/0616 73/700 |
| 7,677,622 B2 * | 3/2010 | Dunkmann | B65G 47/917 294/188 |
| 8,070,203 B2 * | 12/2011 | Schaumberger | B66C 1/0218 294/183 |
| 8,132,835 B2 * | 3/2012 | Ban | B25J 15/0616 294/183 |
| 8,267,386 B2 * | 9/2012 | Schaaf | B65G 47/91 269/20 |
| 8,565,915 B2 * | 10/2013 | Dillon | G06Q 10/047 700/224 |
| 8,641,329 B2 * | 2/2014 | Barrios | B65G 51/14 137/875 |
| 8,662,861 B2 * | 3/2014 | Tell | B25J 15/0675 294/189 |
| 8,721,321 B2 * | 5/2014 | Middleton | B29C 45/14336 425/400 |
| 8,777,284 B2 * | 7/2014 | Schaller | H01L 21/6838 294/185 |
| 9,061,868 B1 * | 6/2015 | Paulsen | B66C 1/0218 |
| 9,492,923 B2 | 11/2016 | Wellman et al. | |
| 9,604,363 B2 * | 3/2017 | Ban | B25J 9/0093 |
| 9,623,570 B1 | 4/2017 | Krahn et al. | |
| 2001/0045755 A1 * | 11/2001 | Schick | B25J 15/06 294/65 |
| 2003/0038491 A1 * | 2/2003 | Schmalz | B25B 11/005 294/185 |
| 2003/0164620 A1 * | 9/2003 | Schmalz | B25J 15/0616 294/188 |
| 2008/0179224 A1 * | 7/2008 | Van Bossuyt | G01R 31/01 209/573 |
| 2009/0019818 A1 * | 1/2009 | Gilmore | B25J 15/0052 53/475 |
| 2013/0129464 A1 * | 5/2013 | Regan | B25J 15/0691 414/800 |
| 2013/0232918 A1 | 9/2013 | Lomerson et al. | |
| 2013/0277999 A1 | 10/2013 | Schaller et al. | |
| 2015/0081090 A1 * | 3/2015 | Dong | B07C 5/3422 700/230 |
| 2015/0298316 A1 * | 10/2015 | Accou | H05K 13/0408 414/752.1 |
| 2015/0328779 A1 | 11/2015 | Bowman et al. | |
| 2015/0375401 A1 * | 12/2015 | Dunkmann | B65G 47/91 700/228 |
| 2017/0050315 A1 * | 2/2017 | Henry | B25J 9/1687 |
| 2017/0057091 A1 | 3/2017 | Wagner et al. | |
| 2017/0072572 A1 | 3/2017 | Wagner et al. | |
| 2017/0080571 A1 | 3/2017 | Wagner et al. | |
| 2017/0080579 A1 | 3/2017 | Wagner et al. | |

FOREIGN PATENT DOCUMENTS

| | | |
|---|---|---|
| DE | 102007054867 A1 | 5/2009 |
| DE | 2011115951 A1 | 4/2013 |
| EP | 1348873 A1 | 10/2003 |
| EP | 1671906 A1 | 6/2006 |
| EP | 1256421 B1 | 1/2008 |
| EP | 2014587 A2 | 1/2009 |
| EP | 2960024 A2 | 12/2015 |
| JP | S6155399 A | 3/1986 |
| JP | 2010201536 A | 9/2010 |
| WO | 2014161549 A1 | 10/2014 |
| WO | 2015162390 A1 | 10/2015 |

OTHER PUBLICATIONS

International Preliminary Report on Patentability issued by the International Bureau in related International Patent Application No. PCT/US2016/050781 dated Mar. 22, 2018, 11 pgs.
Office Action issued by U.S. Patent & Trademark Office in related U.S. Appl. No. 15/260,014 dated Apr. 21, 2017.
International Search Report & Written Opinion issued in related International Patent Application No. PCT/US2016/0507881 dated Dec. 2, 2016, 13 pgs.
International Search Report & Written Opinion issued in related International Patent Application No. PCT/US2016/050781 dated Jan. 18, 2017, 17 pgs.
Partial Search Report issued by the International Searching Authority in related International Patent Application No. PCT/US2016/050781 dated Nov. 25, 2016, 5 pgs.

\* cited by examiner

SYSTEMS AND METHODS FOR PROVIDING DYNAMIC VACUUM PRESSURE IN AN ARTICULATED ARM END EFFECTOR

PRIORITY

The present application claims priority to U.S. patent application Ser. No. 15/259,939 filed Sep. 8, 2016, which claims priority to U.S. Provisional Patent Application Ser. No. 62/215,489 filed Sep. 8, 2015 and U.S. Provisional Patent Application Ser. No. 62/262,136 filed Dec. 2, 2015, the disclosures of which are hereby incorporated by reference in their entireties.

BACKGROUND

The invention generally relates to robotic systems, and relates in particular to robotic systems having an articulated arm with an end effector that employs vacuum pressure to engage objects in the environment.

Most vacuum grippers employ vacuum pressures well below 50% of atmospheric pressure, and are referred to herein as high vacuum. A typical source for a high vacuum gripper is a Venturi ejector, which produces high vacuum but low maximum air flow. Because of the low flow, it is essential to get a good seal between a vacuum gripper and an object, and it is also important to minimize the volume to be evacuated.

Suppliers of ejectors and related system components include Vaccon Company, Inc. of Medway, Mass., Festo US Corporation of Hauppauge, N.Y., Schmalz, Inc. of Raleigh, N.C. and others. In some instances where a good seal is not possible, some systems use high flow devices. Typical high flow devices are air amplifiers and blowers, which produce the desired flows, but cannot produce the high vacuum of a high vacuum source. High flow sources include the side-channel blowers supplied by Elmo Rietschle of Gardner, Denver, Inc. of Quincy, Ill., Fuji Electric Corporation of America of Edison, N.J., and Schmalz, Inc. of Raleigh, N.C. It is also possible to use air amplifiers as supplied by EDCO USA of Fenton, Mo. and EXAIR Corporation of Cincinnati, Ohio Multistage ejectors are also known to be used to evacuate a large volume more quickly, wherein each stage provides higher levels of flow but lower levels of vacuum.

Despite the variety of vacuum systems, however, there remains a need for an end effector in a robotic system that is able to accommodate a wide variety of applications involving engaging a variety of types of items. There is further a need for an end effector that is able to provide high flow vacuum using a gripper that is able to handle a wide variety of objects.

SUMMARY

In accordance with an embodiment, the invention provides a system for providing dynamic vacuum control to an end effector of an articulated arm. The system includes a first vacuum source for providing a first vacuum pressure with a first maximum air flow rate, and a second vacuum source for providing a second vacuum pressure with a second maximum air flow rate. The second vacuum pressure is higher than the first vacuum pressure and the second maximum air flow rate is greater than the first maximum air flow rate.

In accordance with another embodiment, the invention provides a method of providing a dynamic vacuum source for an end effector. The method includes the steps of providing at the end effector a first vacuum having first vacuum pressure and a first vacuum flow, and switching the dynamic vacuum source to provide at the end effector a second vacuum having a second vacuum pressure and a second vacuum flow. The second vacuum pressure is higher than the first vacuum pressure, and the second vacuum flow is greater than the first vacuum flow.

In accordance with a further embodiment, the invention provides a system for providing vacuum control to an end effector of an articulated arm. The system includes a vacuum source for providing a vacuum pressure at a flow rate to the end effector, and the end effector includes a cover that includes an opening that varies significantly in radius from a center of the cover.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a hybrid high flow/high vacuum gripper that can grip a broader set of objects than grippers based on either high flow or high vacuum alone. Previous designs are usually designed for a particular object. When a good seal between vacuum cup and object is possible, a high vacuum device such as a Venturi ejector is typically employed. When a good seal is not possible because of object surface irregularities or porosity, a high flow device such as a regenerative blower is typically employed. The hybrid gripper of an embodiment of the invention, uses either high vacuum or high flow, selected in real time to provide the most effective grip for the object, object pose, and surrounding context.

In various embodiments, therefore, the invention provides a gripper system that combines multiple sources of vacuum, and selecting the source in real time. The invention provides, in an embodiment, a gripper system that switches from a high flow source to a high vacuum source as the pressure drops below the level sustainable by the high flow source, and a gripper system comprising a high flow source with a multistage ejector, so that the non-return valve integrated in the multistage ejector provides a selection mechanism in accordance with further embodiments.

A general approach to a vacuum gripper design, is to characterize the object in question and select the catalog gripper, vacuum source, and other components best suited to the object. Many device suppliers and integrators offer application engineering services to assist in selection of proper components. These options are exercised at system design time however, and result in a system committed to grasp a specific object, or in some instances a few objects.

There are numerous applications for a gripping system that could handle a broad variety of objects, varying in size, weight, and surface properties. The invention provides an approach to address this need by introducing a mechanism to select between a high flow source and a high vacuum source, depending on the present situation.

Figure 1:
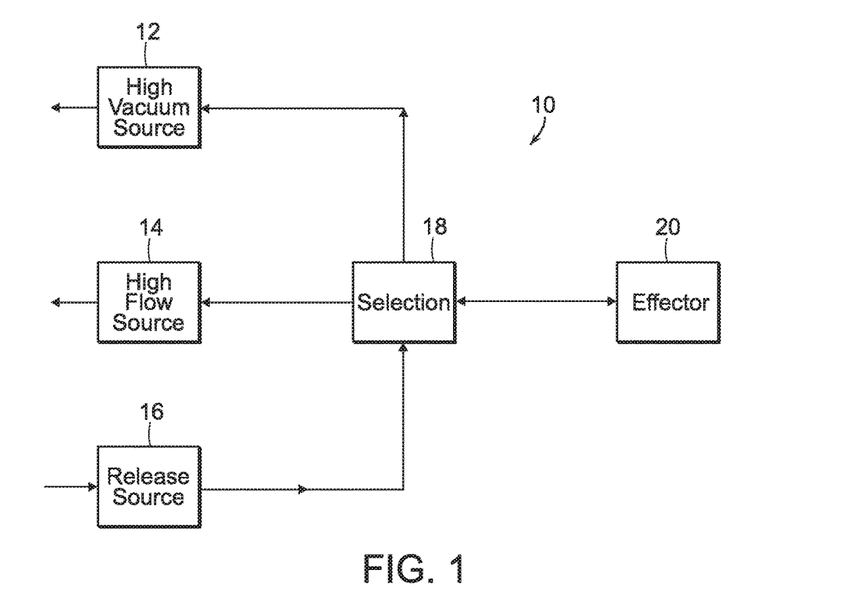
FIG. 1 shows an illustrative block diagrammatic view of a system in accordance with an embodiment of the present invention.

FIG. 1, for example, shows a system 10 in accordance with an embodiment of the present invention in which a high vacuum source 12 is provided as well as a high flow source 14 and a release source 16 that are each coupled to a selection unit 18, that is coupled to an end effector 20. The selection unit 18 selects between the high vacuum source 12, the high flow source 14 and the release source 16 for providing any of high vacuum, vacuum with high flow, or a release flow to the end effector. FIG. 1 therefore shows a general form of the invention, comprising mechanisms for producing high vacuum and high flow, a release source providing either atmospheric pressure via a vent or high pressure (blow off) via a compressor or reservoir, and a mechanism for selecting the source best suited to the present situation.

In accordance with certain embodiments, therefore, the invention provides a system for providing dynamic vacuum control to an end effector of an articulated arm. The system includes a first vacuum source for providing a first vacuum pressure with a first maximum air flow rate, and a second vacuum source for providing a second vacuum pressure with a second maximum air flow rate, wherein the second vacuum pressure is higher than the first vacuum pressure and wherein the second maximum air flow rate is greater than the first maximum air flow rate. The flow rates are characterized as maximum air flow rates because, when an object is engaged at an end effector, the flow rate may drop significantly.

In other embodiments, the invention provides a method for providing a vacuum at an end effector on an articulated arm. The method includes the steps of providing a first vacuum at the end effector at a first vacuum pressure with a first maximum air flow rate, and changing the vacuum at the end effector to a second vacuum with a second vacuum pressure and a second maximum air flow rate.

The selection mechanism may include a set of pneumatic valves driven by an estimated task state, based for example, in part, on sensor input information. The selection mechanism may also select a vent or blow-off source to release a part. In certain cases, the selection mechanism may be based in part on a non-return valve (see FIG. 2), in other cases, a non-return valve integrated in a multistage ejector, with an additional valve to select a vent or blow-off source in order to release a part (see FIG. 3).

Figure 2:
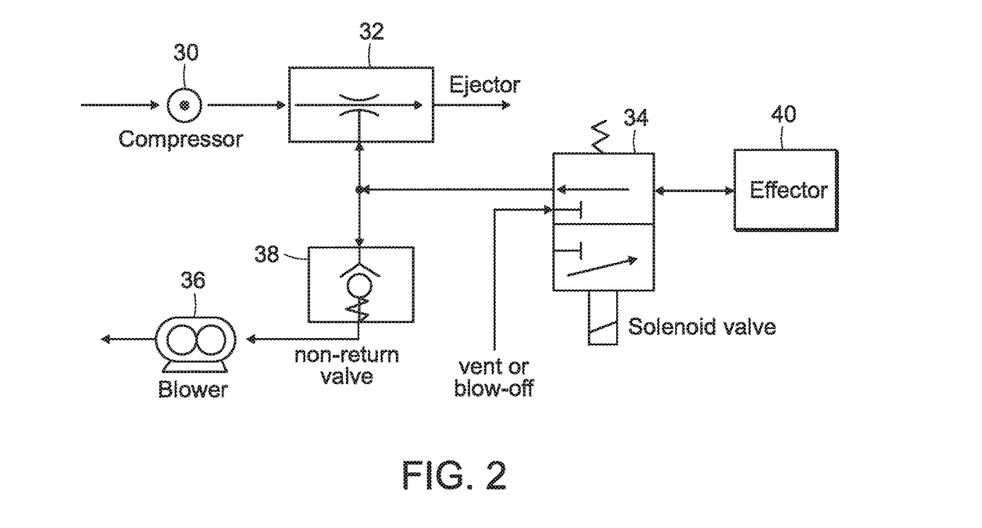
FIG. 2 shows an illustrative diagrammatic view of an example of a system of FIG. 1.

In particular, FIG. 2 shows a system in accordance with an embodiment of the invention that includes a compressor 30 that is coupled to an ejector 32 to provide a high vacuum source that is coupled to a solenoid valve 34. A blower 36 is also coupled to the solenoid valve 34 via a non-return valve 38, and the blower 36 provides a vacuum source with a high maximum flow rate. A vent or blow-off source is also provided to the solenoid valve 34, the output of which is provided to an end effector 40. The system therefore, provides the ejector 32 as the high vacuum source, the regenerative blower 36 as the high flow source, the non-return valve 38 as a passive selection mechanism, and the solenoid valve 34 connecting the effector to the release source, either vent or blow-off.

The vacuum pressure provided by the ejector 32 may be, for example, at least about 90,000 Pascals below atmospheric and the vacuum pressure provided by the blower 36 may be only no more than about 25,000 Pascals below atmospheric, and no more than about 50,000 Pascals below atmospheric in further embodiments. The vacuum pressure provided by the blower 36 is therefore higher than the vacuum pressure provided by the ejector 32. The maximum air flow rate of the ejector may be, for example, no more than about 5 cubic feet per minute (e.g., 1-2 cubic feet per minute), and the maximum air flow rate of the blower may be, for example at least about 100 cubic feet per minute (e.g., 130-140 cubic feet per minute).

Figure 3:
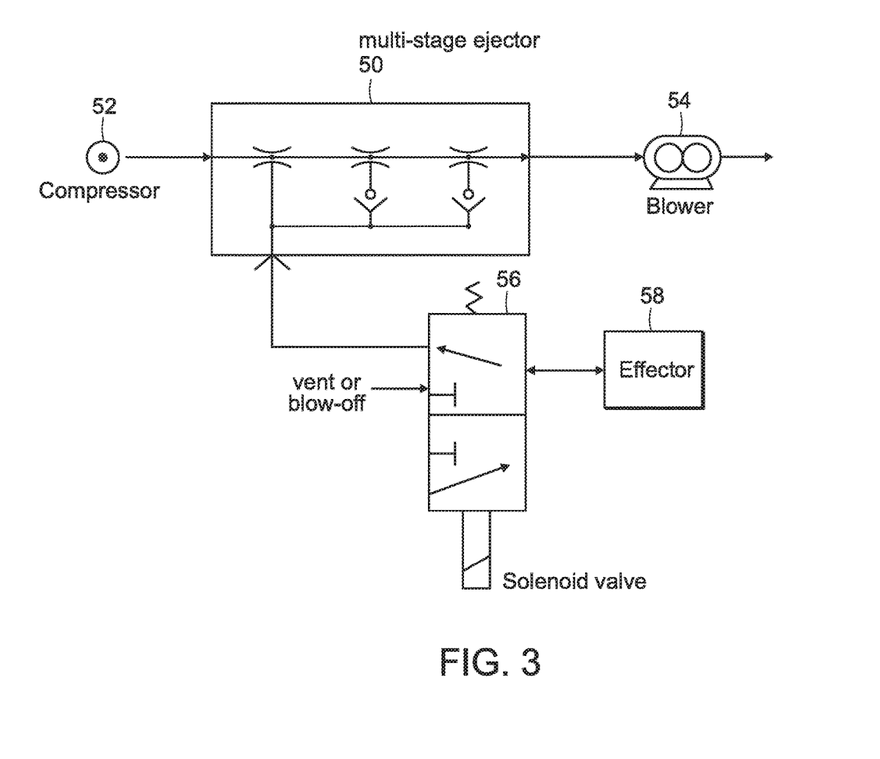
FIG. 3 shows an illustrative diagrammatic view of a system in accordance with another embodiment of the present invention.

FIG. 3, for example, shows another embodiment of the invention that includes a multi-stage ejector 50, a compressor 52 and a blower 54. The multi-stage ejector 50 provides a dynamic vacuum pressure to a solenoid valve 56 that may switch between providing an end effector 58 with either the dynamic vacuum pressure and a vent or blow-off positive air pressure source. The system uses the non-return valve of a multi-stage ejector as the selection mechanism. In particular, the multi-stage ejector includes a series of apertures of increasing size (e.g., left to right as illustrated in FIG. 3). At first, the largest aperture is dominant, evacuating air quickly until the air pressure drops, then the next size aperture become dominant until air pressure drops further, and finally the smallest size aperture becomes dominant. The system of FIG. 3, however, includes check valves on the larger aperture paths as well as the blower 54 to keep the air flow path from defeating the high vacuum, smallest aperture, in the event of a good seal.

Figure 4:
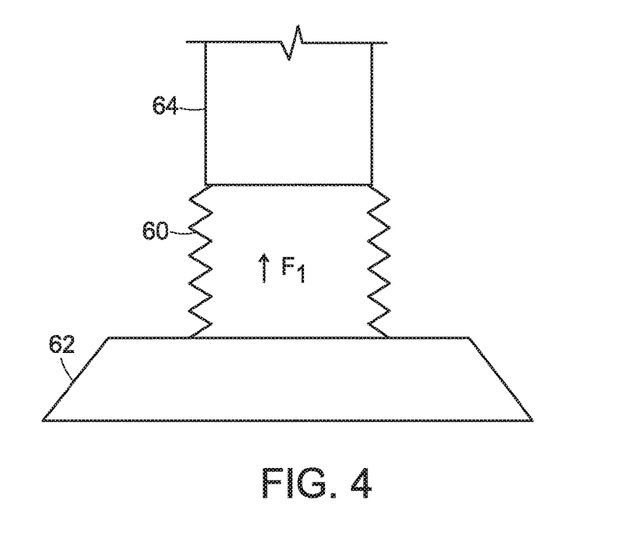
FIG. 4 shows an illustrative diagrammatic view of a system in accordance with an embodiment of the present invention employing a high vacuum source.

For example, with reference to FIG. 4, if a good seal is formed between an end effector 60 on an articulated arm 64 (which may for example, be a tubular or conical shaped bellows) and an object 62, then the vacuum pressure provided by the smaller aperture in the multi-stage ejector 50 remains dominant because the non-return valves in the multi-stage ejector 50 prevent air flow backwards through the blower 54. This will provide that the grasp of object 62 will be maintained by the lower pressure vacuum with a lower maximum air flow rate.

Figure 5:
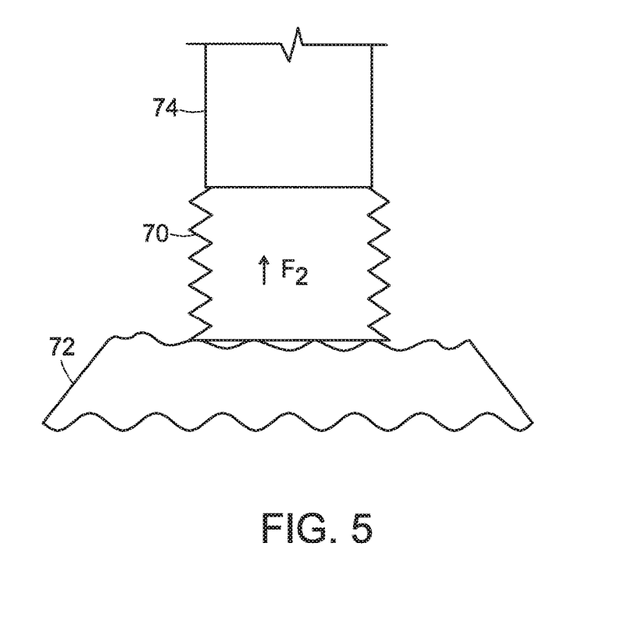
FIG. 5 shows an illustrative diagrammatic view of a system in accordance with another embodiment of the present invention employing a high flow source.

With reference to FIG. 5, if a good seal is not formed between an end effector 70 and an irregularly shaped object 72 on an articulated arm 74, then the blower 54 will dominate maintaining a high flow, therefore maintaining a grasp of object 72 with a higher maximum air flow rate.

Figure 6:
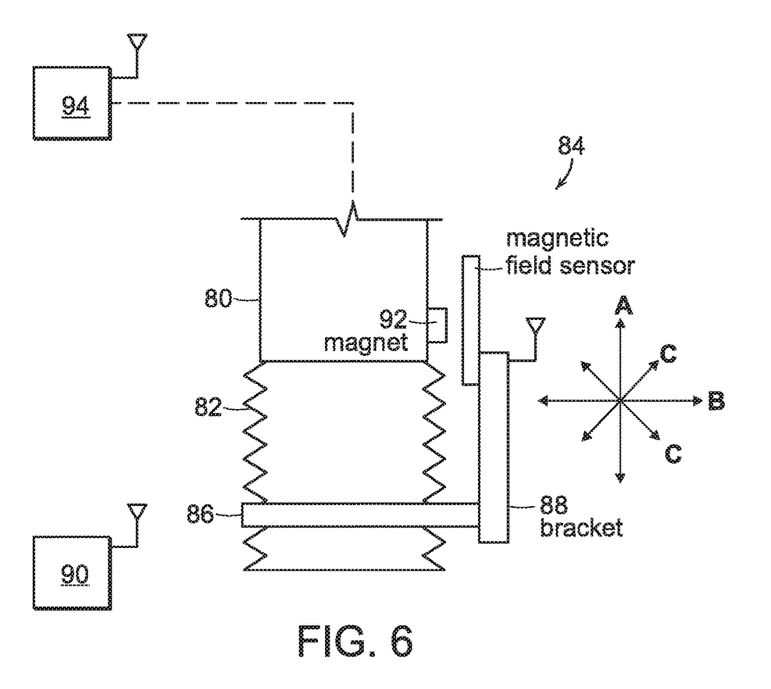
FIG. 6 shows an illustrative diagrammatic view of a detection system together with an end effector of a system of an embodiment of the present invention.

With reference to FIG. 6, in accordance with a further embodiment, the system may include an articulated arm 80 to which is attached an end effector 82, again, which may be a tubular or conical shaped bellows. The end effector 82 also includes a sensor that includes an attachment band 86 on the bellows, as well as a bracket 88 attached to magnetic field sensor 84, and a magnet 92 is mounted on the articulated arm 80. The bellows moves in any of three directions, e.g., toward and away from the articulated arm as shown diagrammatically at A, in directions transverse to the direction A as shown at B, and directions partially transverse to the direction A as shown at C. The magnetic field sensor 84 may communicate (e.g., wirelessly) with a controller 90, which may also communicate with a flow monitor 94 to determine whether a high flow grasp of an object is sufficient for continued grasp and transport as discussed further below. In certain embodiments, for example, the system may return the object if the air flow is insufficient to carry the load, or may increase the air flow to safely maintain the load.

Figure 7A:
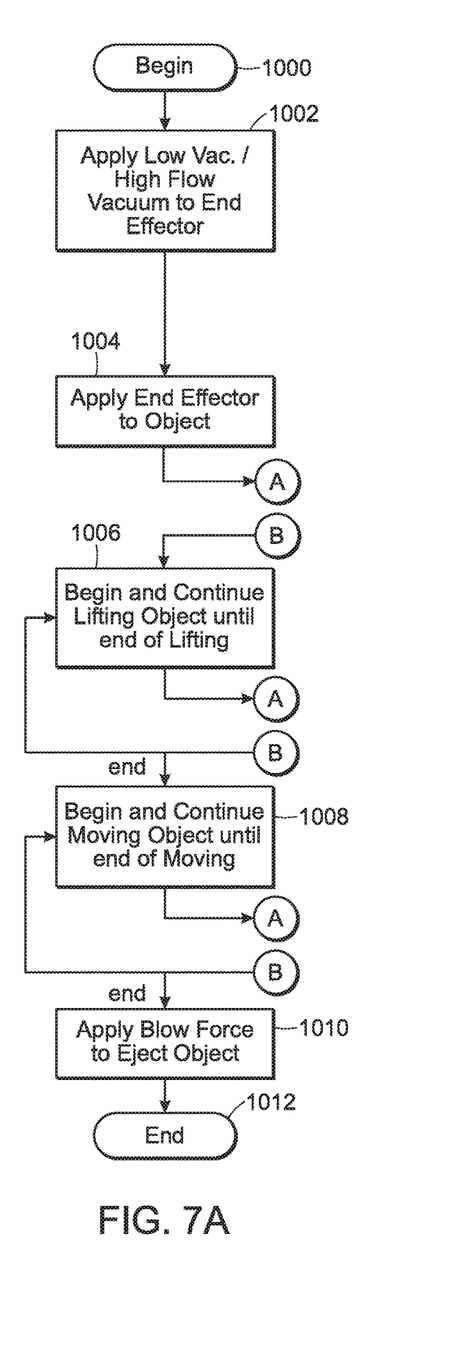
FIGS. 7A and 7B show an illustrative flowchart showing a process in accordance with an embodiment of the present invention.
Figure 7B:
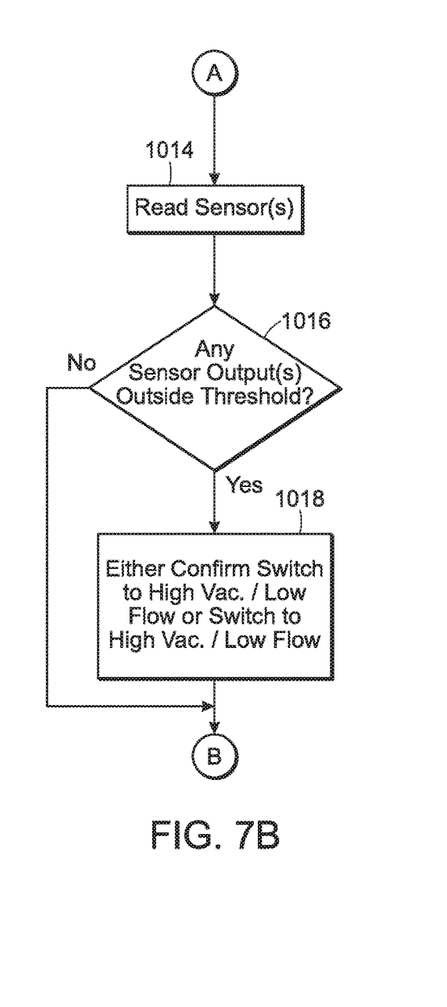

FIGS. 7A and 7B show the process steps of a system in accordance with an embodiment of the present invention, wherein the process begins (step 1000) by applying a high flow/low vacuum source to an end effector (step 1002). The end effector is then applied to an object to be moved (step 1004). Generally, the system begins and continues lifting the object until the end of the lifting routine (step 1006), begins and continues moving the object until the end of the moving routine (step 1008), then applies a positive air pressure force to urge the object from the end effector (step 1010) and then ends (step 1012). If the air flow at the end effector at any points falls too low, then the system may automatically switch to a high vacuum/low flow source as discussed above. In certain embodiments, sensor(s) may be employed to either confirm that such a switch is needed and/or has been made. In further embodiments, the sensor output(s) may drive a mechanical switch to change vacuum sources.

For example, FIG. 7B also shows that once the end effector is applied to an object (step 1004), a subroutine is a called (at A to B) that first reads the one or more sensors (step 1014). If any of the one or more sensor output(s) is outside of a threshold (step 1016), then the system may confirm that the system has switched to a high vacuum/low flow source (step 1018). As noted above, in certain embodiments, the sensor output(s) may drive a mechanical switch that changes the vacuum at the end effector to be a high vacuum/low flow source (step 1018). The system then returns to the step from which it was called. During execution of the beginning and continuing lifting until end (step 1006), the system continuously calls the subroutine (A to B) until the object is fully lifted. The system then moves to the step of beginning and continuing moving the object until end (step 1008), and during execution of this action, the system continuously calls the subroutine (A to B) until the object is fully moved.

The system may therefore, automatically switch between high flow/low vacuum and low flow/high vacuum sources. In certain embodiments, the system may employ sensors to monitor and confirm that such switching is needed and is performed. As noted, the system may also effect the switching responsive to the one or more sensor output(s).

During low vacuum/high flow use, a specialized end effector may be used that provides improved grasping of long narrow objects. Certain grippers that are designed for high flow use to acquire and hold an object generally require large apertures in order to obtain an air flow rate that is high enough to be useful for object acquisition. One drawback of some such grippers in certain applications, is that the object to be acquired may be small, not so small that each of its dimensions is smaller than the high flow opening, but small enough that certain of an object's dimensions is smaller than the opening. For example, long narrow objects such as pens, pencils etc., do not occlude enough of the high flow opening to generate sufficient negative forces to hold the object securely.

Figure 8A:
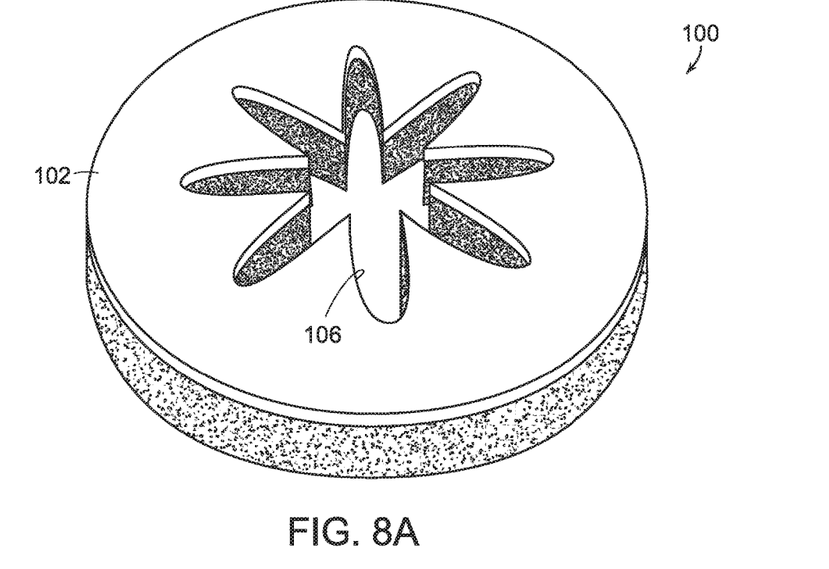
FIGS. 8A and 8B show illustrative diagrammatic views of an end effector cover for use in a system of an embodiment of the present invention.
Figure 8B:
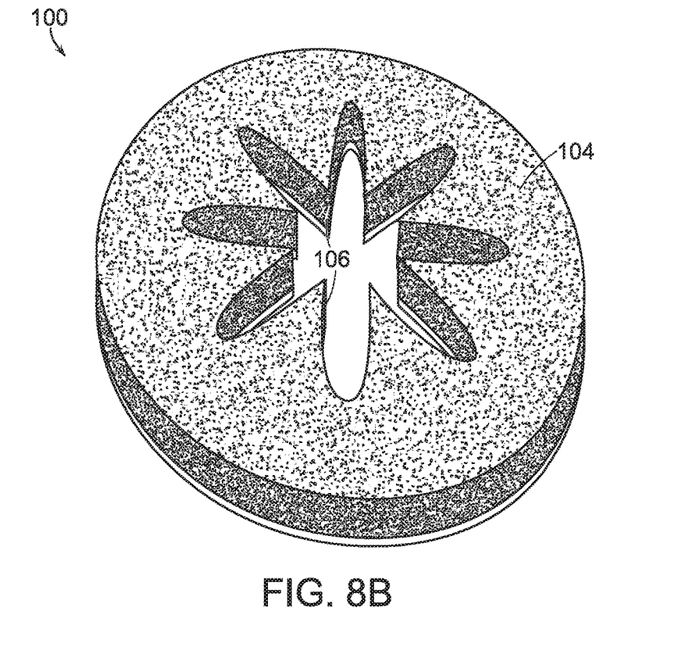

In accordance with an embodiment, the invention provides a specialized cover for use with a high flow vacuum gripper. In particular and as shown in FIGS. 8A (articulated arm facing side) and 8B (object facing side), such a cover 100 may include a proximal back side 102 that does not permit air to flow through the material, and distal front side 104 for engaging objects that is formed of a foam material. Slit openings 106 in form of a star or asterisk shape are provided through the material in this example. During use, elongated objects may be received along opposing slit openings and held by the foam material.

Figure 9:
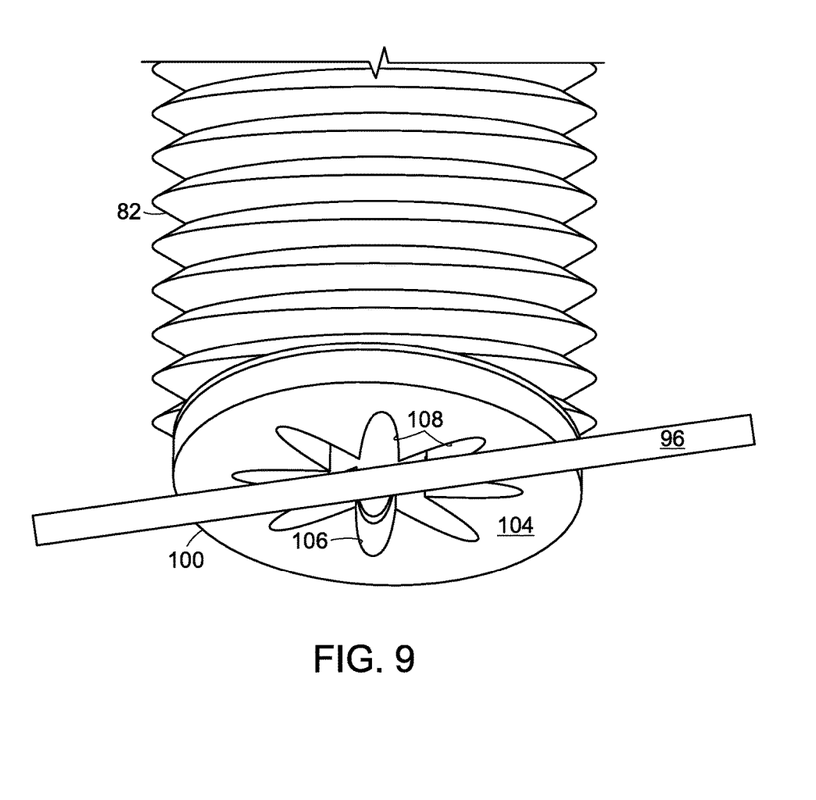
FIG. 9 shows an illustrative diagrammatic view of an end effector of an embodiment of the invention engaging an object.

FIG. 9, for example, shows an elongated object 96 being held against the foam material 104 of a cover 100 that is coupled to the end effector 82. While the elongated object 96 covers some of the opening provided by the slits 106, other portions 108 of the opening provided by the slits 106 remain open. The pattern cut into the material allows for enough area to still obtain a relatively high flow, while providing a number or positions (or orientations) for a long, thin object to block (and thus be held by) a sufficiently high percentage of the air flow.

The compliant foam on the surface 104 contacts the object to be acquired, giving the gripper some compliance while also acting to seal the aperture around the object as the foam is compressed and the high flow vacuum is applied. The aperture cover therefore allows a high flow gripper to effectively pick up long narrow objects with an easy to attach cover that may be held in a tool changer and added or removed from the gripper autonomously during real-time operation.

In accordance with various embodiments, the cover 100 may be applied to the end effector by a human worker into a friction fitting on the end of the end effector, or in certain embodiments, the cover may be provided in a bank of available end effector attachments that the articulated arm may be programmed to engage as needed, and disengage when finished, e.g., using forced positive air pressure and/or a grasping device that secures the end effector attachment for release from the articulated arm.

A system is therefore provided in an embodiment, for providing vacuum control to an end effector of an articulated arm, where the system includes a vacuum source for providing a vacuum pressure at a high flow rate to the end effector, and the end effector includes a cover that includes an opening that varies significantly in radius from a center of the cover. The opening may include finger openings that extend radially from the center of the opening. The opening may be generally star shaped or asterisk shaped. The cover may include compliant foam on a distal side of the cover that engages an object to be grasped, and an air flow resistant material on a proximal side of the cover. The vacuum pressure may be no more than about 50,000 Pascals below atmospheric, and the air flow rate may be at least about 100 cubic feet per minute.

Figure 10A:
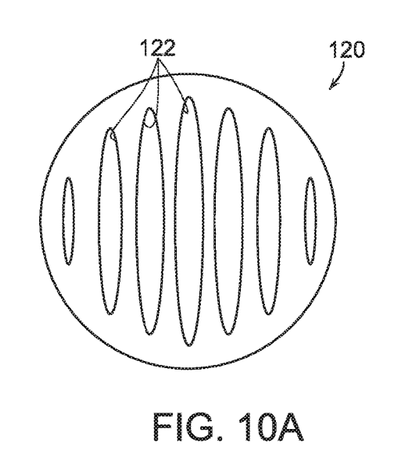
FIGS. 10A-10D show illustrative diagrammatic views of other covers for use with end effectors of systems of further embodiments of the present invention.
Figure 10B:
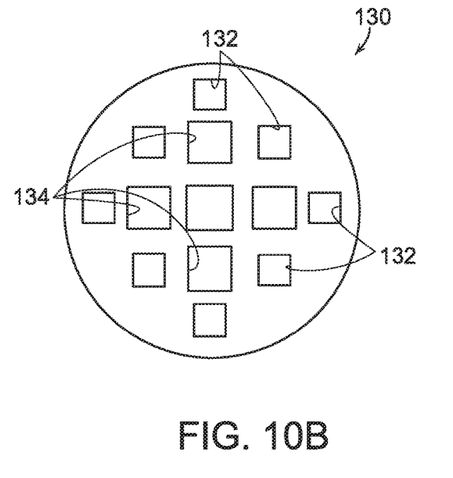
Figure 10C:
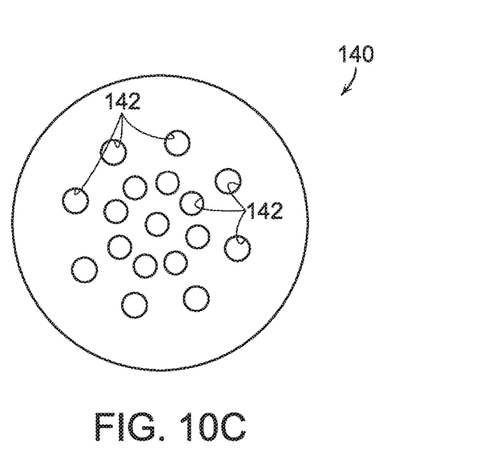
Figure 10D:
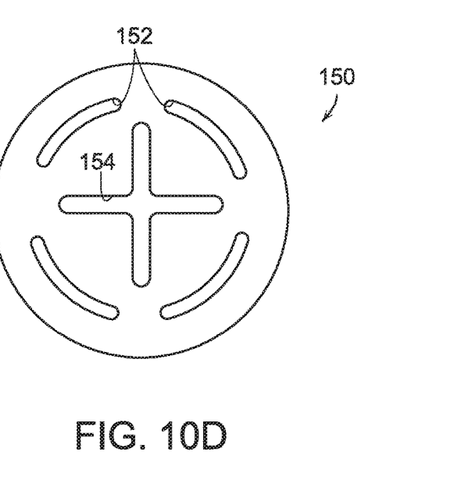

Covers with other types of openings are shown in FIG. 10A-10D. FIG. 10A, for example, shows a cover 120 that includes slit openings 122. FIG. 10B shows a cover 130 that includes different sized square openings 132, 134. Cover 140 shown in FIG. 10C includes small circular openings 142, and cover 150 shown in FIG. 10D includes differently shaped openings 152 and 154. In each of the covers 100, 120, 130, 140 and 150, a compliant foam surface may face the object to be acquired, and more area of the cover is provided to be open closer to the center of the cover with respect to the outer periphery of each cover. For example, in the cover 100, the center of the asterisk shape is most open. In the cover 120, the larger slits are provided in the center. In the cover 130, the larger square openings are provided in the center. In the cover 140, the greater concentration of the circular openings is provided in the center, and in the cover 150, the larger shape 154 is provided in the center.

Figure 11A:
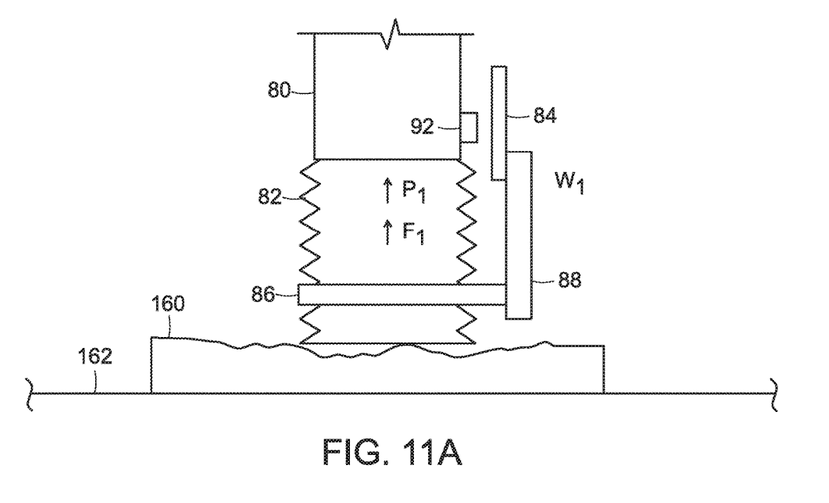
FIGS. 11A and 11B show illustrative diagrammatic views of an end effector in a system of an embodiment of the present invention engaging a relatively light object.
Figure 11B:
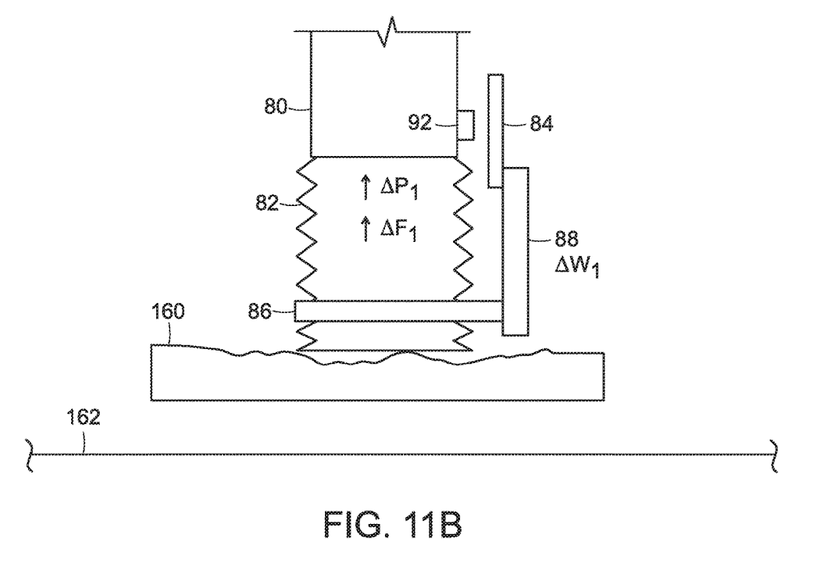
Figure 12A:
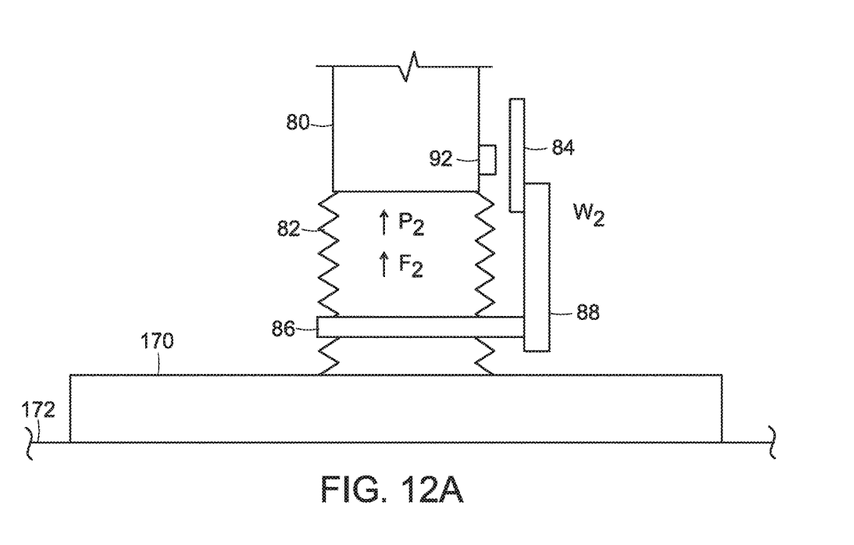
FIGS. 12A and 12B show illustrative diagrammatic views of an end effector in a system of an embodiment of the present invention engaging a relatively heavy object.
Figure 12B:
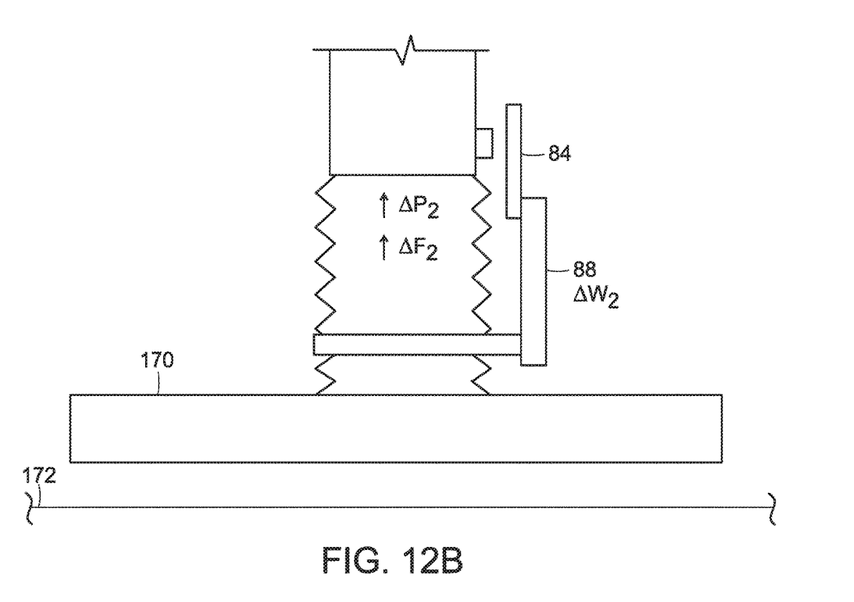

Systems in accordance with certain embodiments of the invention are able to monitor flow within the end effector as well as the weight and balance of an object being grasped. FIGS. 11A and 11B show an object 160 being lifted from a surface 162 by the end effector 82 that includes the load detection device of FIG. 6. The high flow/low vacuum source is initially applied. Upon engaging the object 160, the system notes the position of the detection device and the level of flow ($F_1$) within the end effector as well as the vacuum pressure ($P_1$) and load ($W_1$) as shown in FIG. 11A. Once the object 160 is lifted (FIG. 11B), the system notes the change in the amount of flow ($\Delta F_1$). In this example, the load provided by the object 160 is relatively light ($\Delta W_1$), and a small variation ($\Delta F_1$) in flow may (when considering the load and aperture size) may be accepted, permitting the source to remain high flow/low vacuum. FIGS. 12A and 12B, however, show the end effector lifting a heavy object with a more flat surface.

FIGS. 12A and 12B show an object 170 being lifted from a surface 172 by the end effector 82 that includes the load detection device of FIG. 6. The high flow/low vacuum source is initially applied. Upon engaging the object 170, the system notes the position of the detection device and the level of flow ($F_2$) within the end effector as well as the vacuum pressure ($P_2$) and load ($W_2$) as shown in FIG. 12A. Once the object 170 is lifted (FIG. 12B), the system notes the change in the amount of flow ($\Delta F_2$). As noted above, in this example, the object 170 is heavy ($\Delta W_2$), presenting a higher load. The system will evaluate the load in combination with the flow ($F_2$) and pressure ($P_2$) as well as the change in flow ($\Delta F_2$) and change in pressure ($\Delta P_2$) to assess the grasp of the object. The system may automatically switch to the high vacuum, low flow vacuum source as discussed above.

Figure 13A:
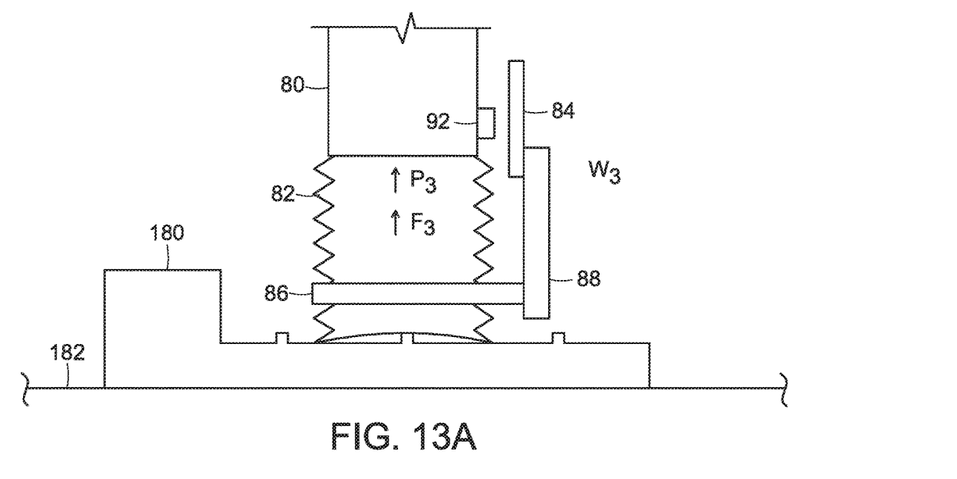
FIGS. 13A and 13B show illustrative diagrammatic views of an end effector in a system of an embodiment of the present invention engaging an object that presents an unbalanced load.
Figure 13B:
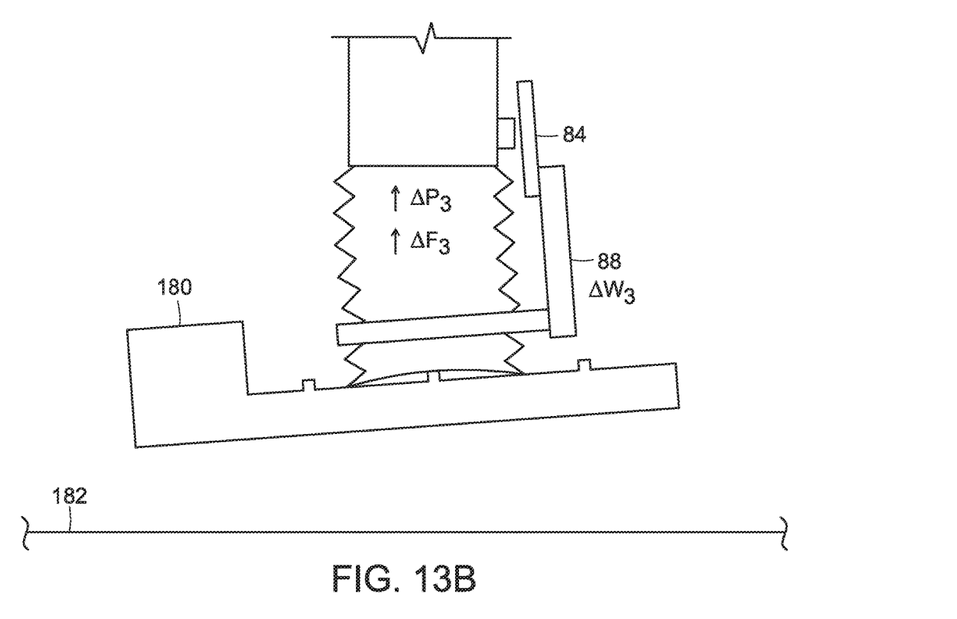

The system may also detect whether a load is not sufficiently balanced. FIGS. 13A and 13B show an object 180 being lifted from a surface 182 by the end effector 82 that includes the load detection device of FIG. 6. The high flow/low vacuum source is initially applied. Upon engaging the object 180, the system notes the position of the detection device and the level of flow ($F_3$) within the end effector as well as the vacuum pressure ($P_3$) and load ($W_3$) as shown in FIG. 13A. Once the object 180 is lifted (FIG. 13B), the system notes the change in the amount of flow ($\Delta F_3$). In this example, the object 180 presents a non-balanced load ($\Delta W_3$). The system will evaluate the load in combination with the flow ($F_3$) and pressure ($P_3$) as well as the change in flow ($\Delta F_3$) and change in pressure ($\Delta P_3$) to assess the grasp of the object. The system may automatically switch to the high vacuum, low flow vacuum source as discussed above. In each of the examples of FIGS. 11A-13B, any of vacuum pressure sensors, flow sensors, weight and balance detections may be employed to monitor the status of the end effector and the load, and the switching may occur automatically, or by analysis of the above values.

In accordance with certain embodiments, the system may switch between a high vacuum, low flow source and a low vacuum high flow source depending on input from the sensor 84. For example, if an object is engaged such that the bellows is substantially moved in either directions B or C, then the system may elect to maintain the high vacuum, low flow source, or may elect to return the object without moving the object.

As discussed above, during low vacuum/high flow use, a specialized end effector may be used that provides improved grasping of long narrow objects. Certain grippers that are designed for high flow use to acquire and hold an object generally require large apertures in order to obtain an air flow rate that is high enough to be useful for object acquisition. One drawback of some such grippers in certain applications, is that the object to be acquired may be small, not so small that each of its dimensions is smaller than the high flow opening, but small enough that certain of an object's dimensions is smaller than the opening. For example, long narrow objects such as pens, pencils etc., do not occlude enough of the high flow opening to generate sufficient negative forces to hold the object securely.

In accordance with an embodiment, therefore, the system provides vacuum control to an end effector of an articulated arm, where the system includes a vacuum source for providing a vacuum pressure at a flow rate to the end effector, and the end effector includes a cover that includes an opening that varies significantly in radius from a center of the cover. The opening may include finger openings that extend radially from the center of the opening. The opening may be generally star shaped or asterisk shaped. The cover may include compliant foam on a distal side of the cover that engages an object to be grasped, and an air flow resistant material on a proximal side of the cover. The vacuum pressure may be no more than about 25,000 Pascals below atmospheric, and the air flow rate may be at least about 100 cubic feet per minute to provide a high flow/low vacuum source. The cover may include an opening that varies significantly in radius from a center of the cover, and the opening may include finger openings that extend radially from the center of the opening, and for example, may be generally star shaped or asterisk shaped.

Those skilled in the art will appreciate that numerous modifications and variations may be made to the above disclosed embodiments without departing from the spirit and scope of the present invention.

What is claimed is:

1. A system for providing vacuum control to an end effector of an articulated arm, said system comprising a first vacuum source for providing a first vacuum pressure at a first maximum air flow rate to the end effector, a second vacuum source for providing a second vacuum pressure at a second maximum air flow rate that is greater than the first maximum air flow rate, and selection means for selecting between the first vacuum source and the second vacuum source, said end effector including a cover that includes an opening area that varies in size from a center of the cover to a periphery of the cover.

2. The system as claimed in claim 1, wherein the opening area includes finger openings that extend radially from the center of the opening toward the periphery of the opening.

3. The system as claimed in claim 1, wherein the cover includes a plurality of openings that decrease in size from a center of the cover.

4. The system as claimed in claim 1, wherein the opening area includes a single opening.

5. The system as claimed in claim 1, wherein the opening area includes a plurality of openings, which include a central opening at the center of the cover.

6. The system as claimed in claim 5, wherein the plurality of openings decrease in size toward the periphery of the cover.

7. The system as claimed in claim 1, wherein the cover includes a compliant distally facing material.

8. The system as claimed in claim 1, wherein the selection means includes a multi-stage ejector.

9. A system for providing vacuum control to an end effector of an articulated arm, said system comprising a first vacuum source for providing a first vacuum pressure at a first maximum air flow rate to the end effector, a second vacuum source for selectively providing a second vacuum pressure at a second maximum air flow rate that is greater than the first maximum air flow rate, said end effector including a cover that includes an opening area that varies air flow restriction from a center of the cover to a periphery of the cover.

10. The system as claimed in claim 9, wherein the opening area includes finger openings that extend radially from the center of the opening toward the periphery of the opening.

11. The system as claimed in claim 9, wherein the cover includes a plurality of openings that decrease in size from a center of the cover.

12. The system as claimed in claim 9, wherein the opening area includes a single opening.

13. The system as claimed in claim 9, wherein the opening area includes a plurality of openings, which include a central opening at the center of the cover.

14. The system as claimed in claim 13, wherein the plurality of openings decrease in size toward the periphery of the cover.

15. The system as claimed in claim 9, wherein the cover includes a compliant distally facing material.

16. A method of providing vacuum control to an end effector of an articulated arm, said method comprising the steps of providing a first vacuum pressure at a first maximum air flow rate to the end effector by a first vacuum source, providing a second vacuum pressure at a second maximum air flow rate by a second vacuum source that is greater than the first maximum air flow rate, switching between the first vacuum source and the second vacuum source, and providing an opening area in a cover on the end effector that reduces in size from a center of the cover to a periphery of the cover.

17. The method as claimed in claim 16, wherein the opening area includes finger openings that extend radially from the center of the opening toward the periphery of the opening.

18. The method as claimed in claim 16, wherein the cover includes a plurality of openings that decrease in size from a center of the cover.

19. The method as claimed in claim 16, wherein the opening area includes a single opening.

20. The method as claimed in claim 16, wherein the opening area includes a plurality of openings, which include a central opening at the center of the cover.

21. The method as claimed in claim 20, wherein the plurality of openings decrease in size toward the periphery of the cover.

22. The method as claimed in claim 16, wherein the cover includes a compliant distally facing material.

\* \* \* \* \*